US006727917B1

(12) United States Patent
Chew et al.

(10) Patent No.: US 6,727,917 B1
(45) Date of Patent: Apr. 27, 2004

(54) USER INTERFACE FOR PALM-SIZED COMPUTING DEVICES AND METHOD AND APPARATUS FOR DISPLAYING THE SAME

(75) Inventors: Chee H. Chew, Redmond, WA (US); Elizabeth A. Bastiaanse, Cambridge, MA (US); Jeffrey R. Blum, Seattle, WA (US); Christen E. Coomer, Seattle, WA (US); Mark H. Enomoto, Seattle, WA (US); Greg A. Keyser, Sammamish, WA (US); Kathryn L. Parker, Fall City, WA (US); William H. Vong, Redmond, WA (US); Sarah E. Zuberec, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/564,928

(22) Filed: May 4, 2000

Related U.S. Application Data

(60) Provisional application No. 60/175,112, filed on Jan. 6, 2000.

(51) Int. Cl.$^{7}$ .................................................. G06F 3/14
(52) U.S. Cl. ........................................ 345/765; 345/179
(58) Field of Search ................................. 345/701, 776, 345/808, 157, 158, 169, 173, 764, 765, 835, 179

(56) References Cited

U.S. PATENT DOCUMENTS 5,588,105 A * 12/1996 Foster et al. ................ 345/700
5,666,438 A * 9/1997 Beernink et al. ........... 382/189
6,243,071 B1 * 6/2001 Shwarts et al. ............. 345/146

* cited by examiner

*Primary Examiner*—Cao (Kevin) Nguyen
(74) *Attorney, Agent, or Firm*—Westman, Champlin & Kelly, P.A.

(57) ABSTRACT

The hand-held computing device user interface (UI) of the present invention displays information for an active application program in a middle portion of the screen, and displays a shell program controlled navigation bar at a top portion of the screen. The navigation bar includes a navigation icon which when tapped by the stylus aids the user in navigating to other application programs. The navigation bar also includes a title for the active application program, thus saving vertical real estate on the screen. The UI of the present invention also displays an application menu bar at a bottom portion of the screen so that the user of the hand-held device can manipulate data from the active application by tapping menu items with a stylus without blocking view of the middle portion of the display.

20 Claims, 8 Drawing Sheets

USER INTERFACE FOR PALM-SIZED COMPUTING DEVICES AND METHOD AND APPARATUS FOR DISPLAYING THE SAME

REFERENCE TO RELATED APPLICATION

The present application claims priority from U.S. Provisional Application Ser. No. 60/175,112, filed on Jan. 6, 2000 and entitled "USER INTERFACE FOR PALM-SIZED COMPUTING DEVICES AND METHOD AND APPARATUS FOR DISPLAYING THE SAME."

REFERENCE TO CO-PENDING APPLICATIONS

Reference is hereby made to co-pending U.S. patent applications, entitled "METHOD AND APPARATUS FOR FAST SEARCHING OF HAND-HELD CONTACTS LISTS", attorney docket number M61.12-0225; entitled "SMART COLUMN FOR CONTACT INFORMATION ON PALM-SIZED COMPUTING DEVICES AND METHOD AND APPARATUS FOR DISPLAYING THE SAME", attorney docket number M61.12-0226; entitled "USER INTERFACE FOR PALM-SIZED COMPUTING DEVICES AND METHOD AND APPARATUS FOR DISPLAYING THE SAME", attorney docket number M61.12-0227; entitled "METHOD AND APPARATUS FOR PROVIDING CONTEXT MENUS ON A PEN-BASED DEVICE", attorney docket number M61.12-0228; entitled "METHOD AND APPARATUS FOR PROVIDING RECENT CATEGORIES ON A HAND-HELD DEVICE", attorney docket number M61.12-0229.

BACKGROUND OF THE INVENTION

The present invention relates to hand-held personal computing devices commonly known as hand-held devices or palm-size devices. More particularly, the present invention relates to an improved user interface (UI) for a palm-held portable computer.

Hand-held devices are small electronic computing devices, sometimes also referred to as personal digital assistants (PDAs). Generally, these devices fit comfortably in the palm of a user's hand. Hand-held devices have gained a niche as personal organizers, allowing users to view or change lists of contacts, tasks or calendar events on a display using an interface device such as a keyboard (typically integrated into a touch sensitive display) and a stylus.

In a hand-held device running more than one application, there is a need for improved UI mechanisms for manipulating data, for providing feedback, for controlling the applications, and for navigating between the different applications. All these peripheral UI mechanisms are needed around the actual data content of the applications. However, there is very limited screen or display real estate available for displaying both the data and the UI for the applications and/or shell program. As screen real estate is utilized for UI application functions, the amount of data which can be displayed to the user decreases accordingly. Thus, there is a need for methods of efficiently displaying application and shell program information on a limited size screen.

SUMMARY OF THE INVENTION

The present invention includes apparatus and methods for generating a user interface (UI), for a stylus based hand-held device, which maximizes screen real estate available for displaying data, and which provides a mechanism to efficiently manipulate data and to switch between application programs.

The hand-held computing device UI of the present invention displays information for an active application program in a middle portion of the screen, and displays a shell program controlled navigation bar at a top portion of the screen. The navigation bar includes a navigation icon which when tapped by the stylus aids the user in navigating to other application programs. The navigation bar also includes a title for the active application program, thus saving vertical real estate on the screen. The UI of the present invention also displays an application menu bar at a bottom portion of the screen so that the user of the hand-held device can manipulate data from the active application by tapping menu items with a stylus without blocking the view of the middle portion of the display.

DETAILED DESCRIPTION OF ILLUSTRATIVE EMBODIMENTS

Figure 1:
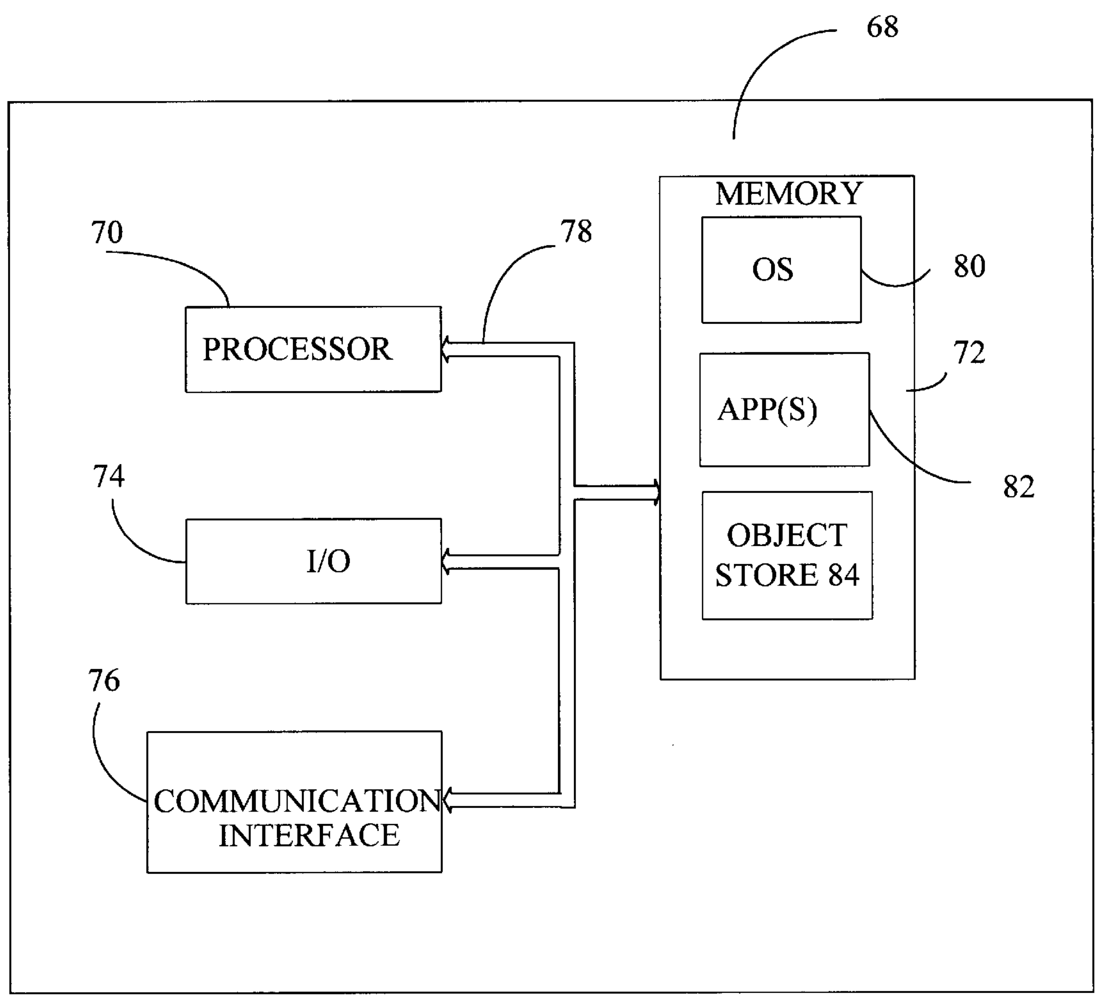
FIG. 1 is a block diagram of a hand-held device computing environment in which embodiments of the present invention may be practiced.

FIG. 1 is a block diagram of a hand-held device 68, which is an exemplary computing environment for the present invention. Hand-held device 68 includes a microprocessor 70, memory 72, input/output (I/O) components 74, a communication interface 76 for communicating with, for example, a separate computer or hand-held device. In one embodiment, the aforementioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS CE" brand operating system commercially available from Microsoft Corporation, also known as Windows for Pocket PC. Operating system 80 is preferably designed for hand-held devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Input/output components 74 can include, for example, input devices such as a keyboard, a mouse or other pointing device, touch sensitive display components, and control buttons. Input/output components 74 can also include output devices such as liquid crystal displays and speakers. Further, input/output components 74 include electronics and/or software associated with these devices or with other devices such as printers.

Communication interface 76 represents numerous devices and technologies that allow hand-held device 68 to send and receive information. The devices include wired and wireless modems, satellite receivers and broadcast tuners to name a few. In some embodiments, mobile device 68 can also be directly connected to a computer to exchange data therewith. In such cases, communication interface 76 can be an infrared transceiver or a serial, parallel, USB, Ethernet or other type of communication connection, all of which are capable of transmitting streaming information. While communication interface 76 is included in various forms in many embodiments of the invention, communication interface 76 is optional in yet other embodiments if sending and receiving information is not required.

Figure 2:
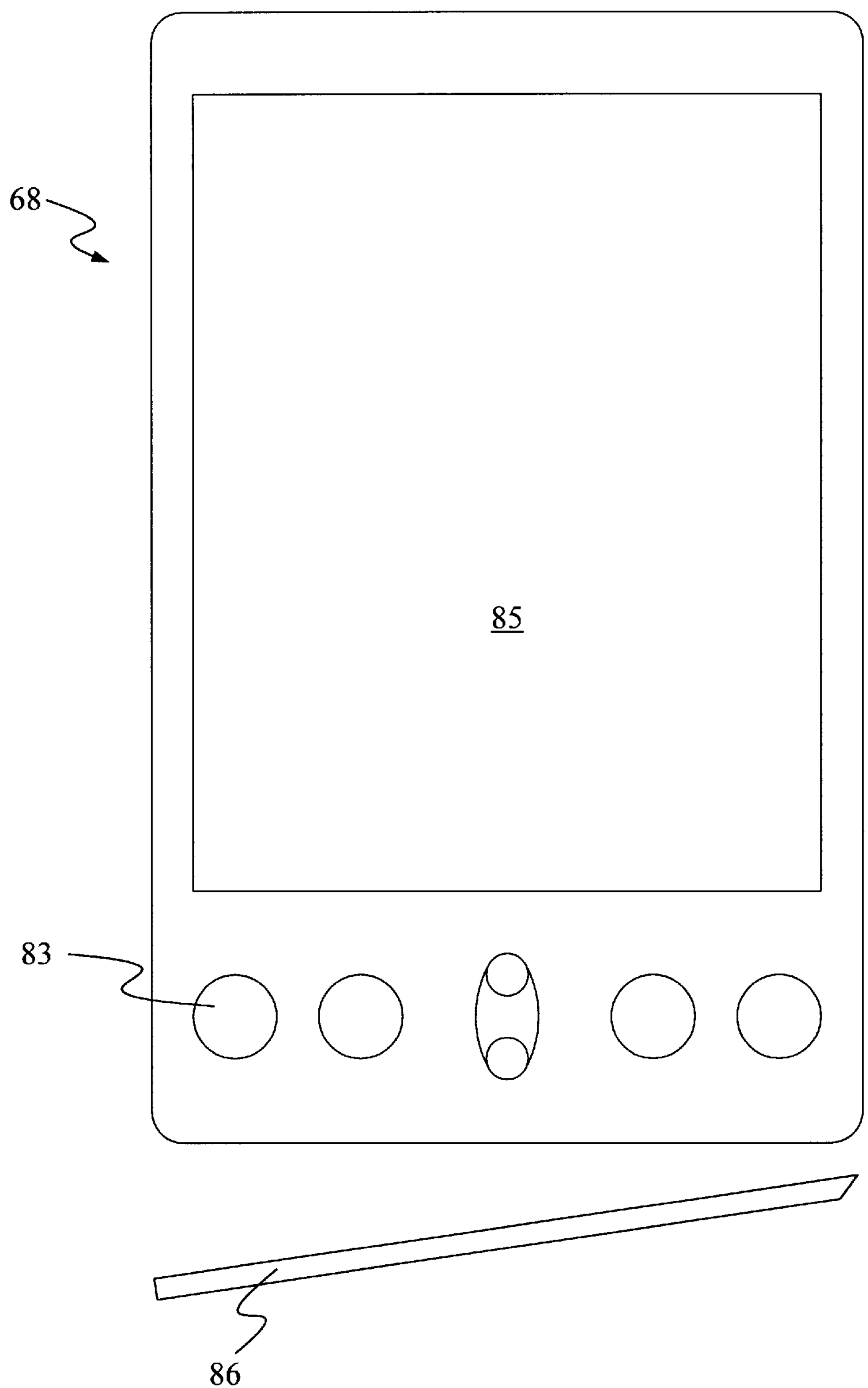
FIG. 2 is a front view of a hand-held computing device on which embodiments of the present invention may be practiced.

FIG. 2 is a simplified pictorial illustration of device 68. Device 68 can be a desktop assistant sold under the designation H/PC; a palm-size PC or Pocket PC designated as P/PC having software provided by the Microsoft Corporation. In one embodiment, device 68 includes a set of control buttons 83, display 85 and stylus 86. In the embodiment shown in FIG. 2, display 85 is a liquid crystal display (LCD) which uses a contact sensitive display screen in conjunction with stylus 86. Stylus 86 is used to press or contact display 85 at designated coordinates to accomplish certain user input functions. In some embodiments, a miniaturized keyboard with alpha-numeric keys is provided with the mobile device. In other embodiments, a "soft" keyboard 92 accessible through a soft input panel (SIP) button/icon 90 provided through a contact sensitive display screen (shown in FIGS. 3–10) on the device. In yet other embodiments, a character recognition module is employed to recognize characters written on the contact sensitive display screen using stylus 86.

In some hand-held device UIs, a number of difficulties can be experienced. For example, in some instances the UI provides no title bar indicating the name of the current application program being displayed to the user. Generally, for optimal use, the user needs to be aware of which application is active and must allow time for his or her mind to discern that they are in the particular application (e.g., a Contacts application). However, if a conventional application program title bar were simply added to the UI, vertical screen real estate would be consumed, which is already in short supply in a small hand-held device.

Another characteristic of conventional hand-held device UIs is that the application commands (the commands that manipulate the data on the screen) are located at the top of the screen. As a result, for the user to select a data manipulating command or device, his or her hand frequency has to obscure the data in order to get to the commands with the stylus. Meanwhile, the shell navigation program icon, which is used to switch between application programs, is displayed at the bottom of the screen. Therefore, when the user wishes to navigate away from the current data set (i.e., wishes to utilize a different data set and application program), his or her hand does not obscure the screen.

A hand-held device UI of the present invention addresses these problems. FIGS. 3–8 illustrate features of a hand-held device UI 300 that is shown on display 85 of FIG. 2 under various embodiments of the present invention. In FIGS. 3–6 and 8, UI 300 is shown in use with a Contacts application program. However, UI 300 is not limited to use with Contacts applications, and can be used with a wide variety of applications adapted for hand-held devices.

Figure 3:
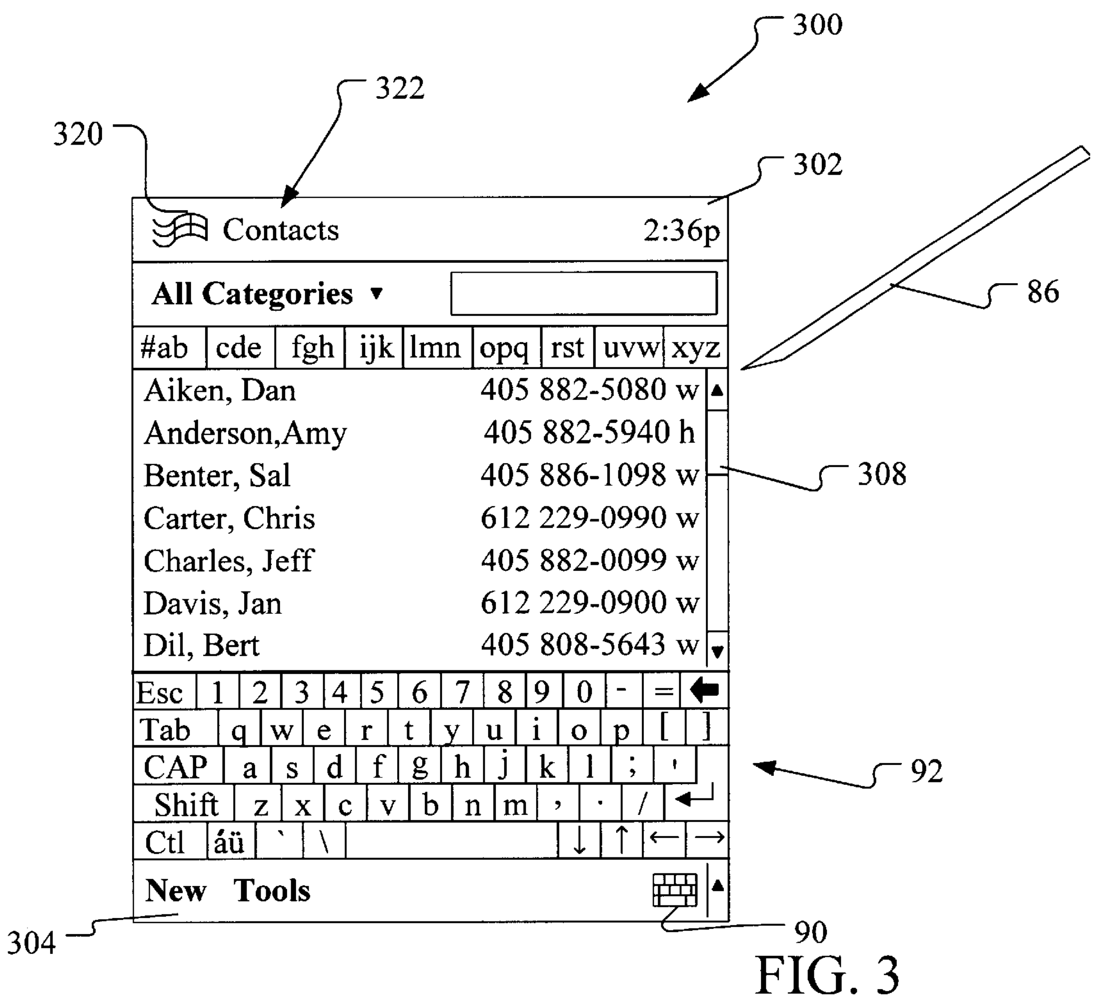
FIG. 3 is a screen-shot of a display showing a portion of a hand-held device user interface (UI) in accordance with embodiments of the invention and showing a soft input panel.

As shown in FIG. 3 with a Contacts window active, UI 300 includes a shell program navigation bar 302 and an application program menu bar 304. UI 300 also includes scroll bar 308 for moving within the active application program, as well as a soft input panel (SIP) 92 and an SIP button/icon 90. By tapping stylus 86 on the letters on SIP 92, the user is able to input data into the application programs.

Figure 4:
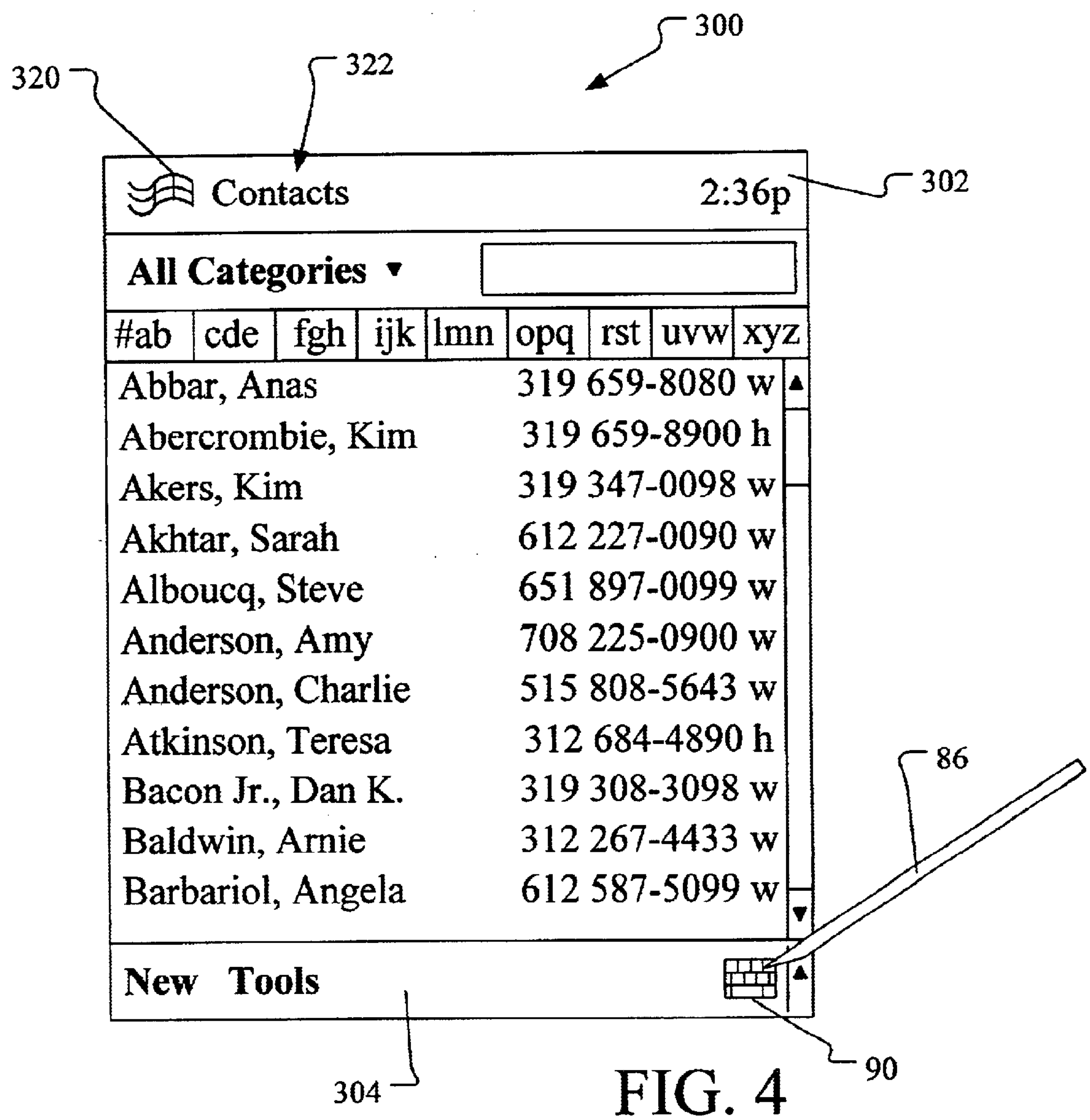
FIG. 4 is a screen-shot of a display showing a portion of the hand-held device UI shown in FIG. 3, showing the soft input panel removed from view.

Referring to FIG. 4, it can be seen that by tapping SIP icon 90 with stylus 86, SIP 92 can be removed from view in the window of UI 300 to allow for additional screen real estate on which the shell and application programs may be displayed. FIGS. 4–8 illustrate UI 300 with SIP 92 removed from view.

Referring back to FIG. 3, UI 300 is provided with several significant differences from prior art hand-held device UIs. As in the prior art, shell program navigation bar 302 can include navigation or start menu icon 320 for use in implementing shell program functions and for navigating between application programs (i.e., Contacts programs, Tasks programs, Calendar programs and the like). The start menu icon shown is a trademark of Microsoft Corporation, and other start or navigation menu icons can be used in the present invention. In contrast to prior art hand-held device UIs, in UI 300 navigation bar 302 is positioned at the top of the screen instead of at the bottom of the screen. Also in contrast to the prior art, this navigation bar serves a dual purpose.

First, navigation bar 302 serves as a shell program navigation tool in the same or similar manner as navigation or start menus in the prior art. The second purpose provided by shell program navigation bar 302 is that it also acts as a title bar for the active application program. Thus, it displays the title or name 322 of the current active application, which in FIG. 3 is a Contacts application. Application title 322 displayed by shell program navigation bar 302 closely resembles prior art application title bars so that the user quickly comprehends that this is the title of the application. The start flag icon 320 with title 322 positioned beside it provides familiarity with the start icon from some desktop UIs. As will be discussed later with reference to FIGS. 5–7, when a start menu is deployed, the title displayed by shell program navigation bar 302 changes from the title of the active application to "Start" in order to reinforce to the user the correlation between the navigation bar and its corresponding functions.

Another significant feature of UI 300 is that the application menu bar 304 is displayed at the bottom of the screen. It has been found that the user's eyes first gravitate to the top of the screen, so it is beneficial to put the "anchoring" data there. Stagnant information such as application commands (available through the menu bar 304) can be placed in a less vital but still extremely accessible screen location (the bottom). In this manner, when the user wishes to issue a command upon the data in the middle of the screen, he or she goes to the menu commands at the bottom and his or her hand does not obscure the data. Only when the user is ready to navigate to another application does the user's hand obscure the screen.

Figure 5:
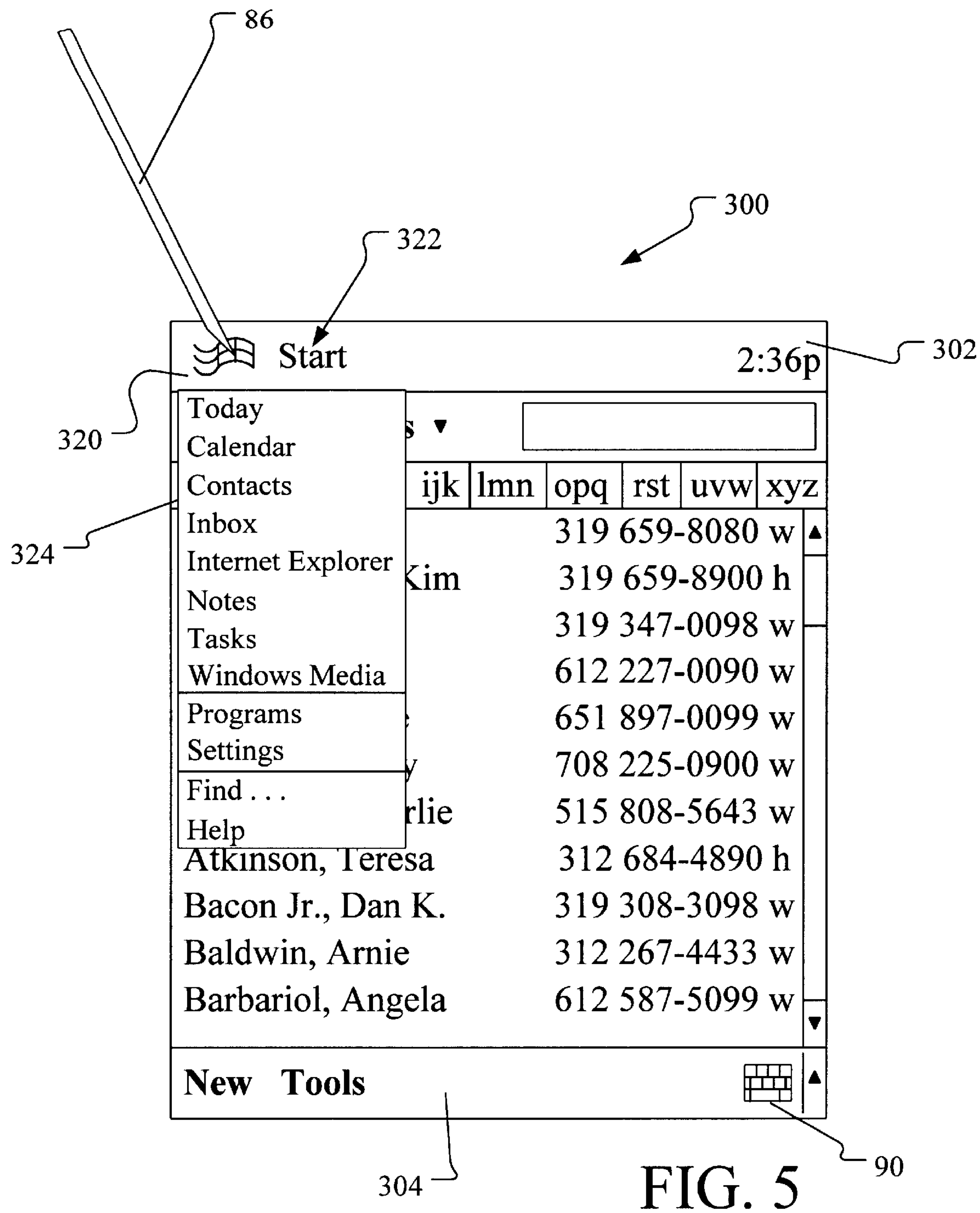
FIG. 5 is a screen-shot of a display showing the portion of the UI of FIG. 4, but with a shell program navigation or start menu deployed.
Figure 6:
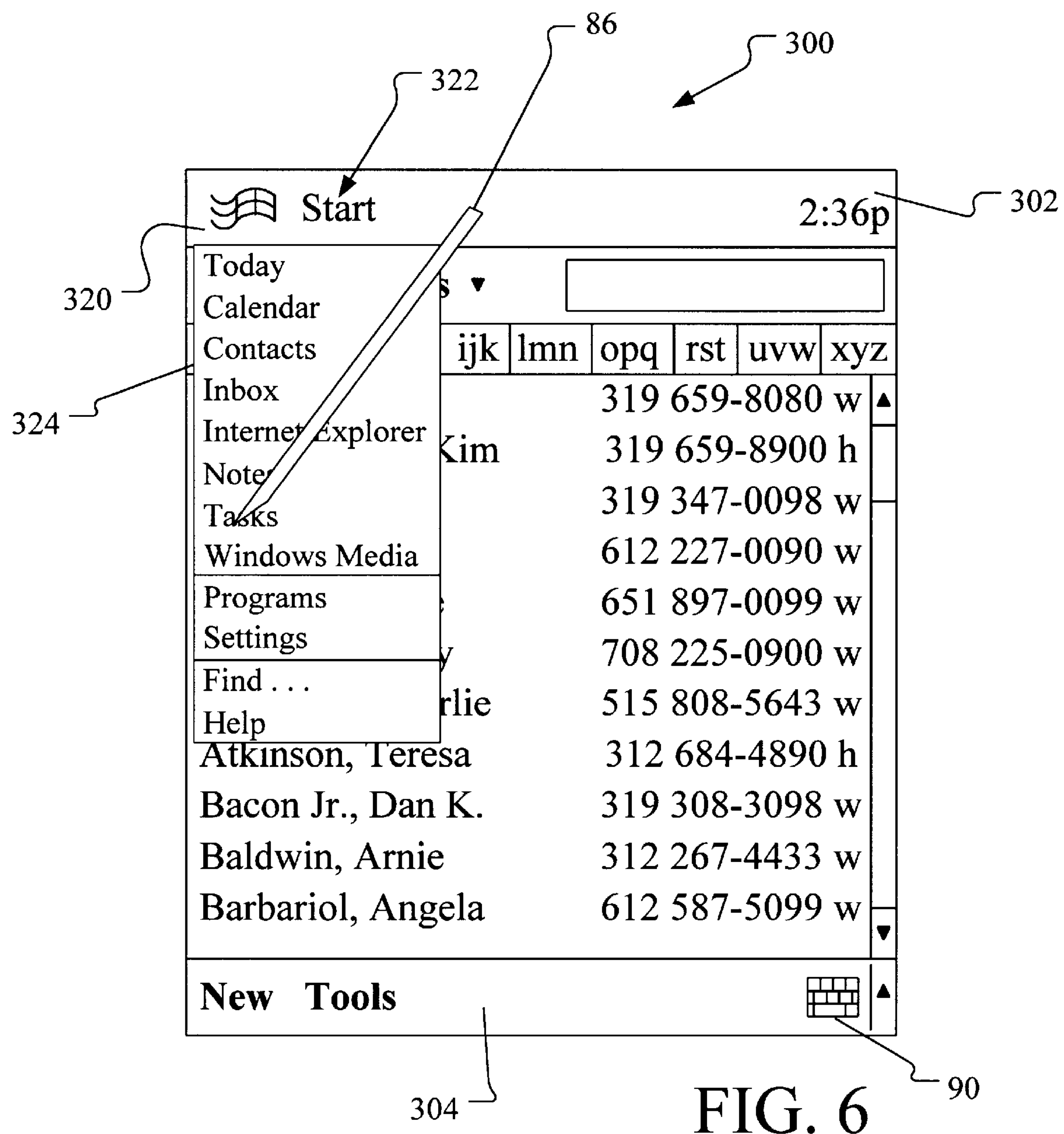
FIGS. 6–7 are screen-shots of the display shown in FIG. 5, which illustrate UI mechanisms for changing application information displayed by the shell program.
Figure 7:
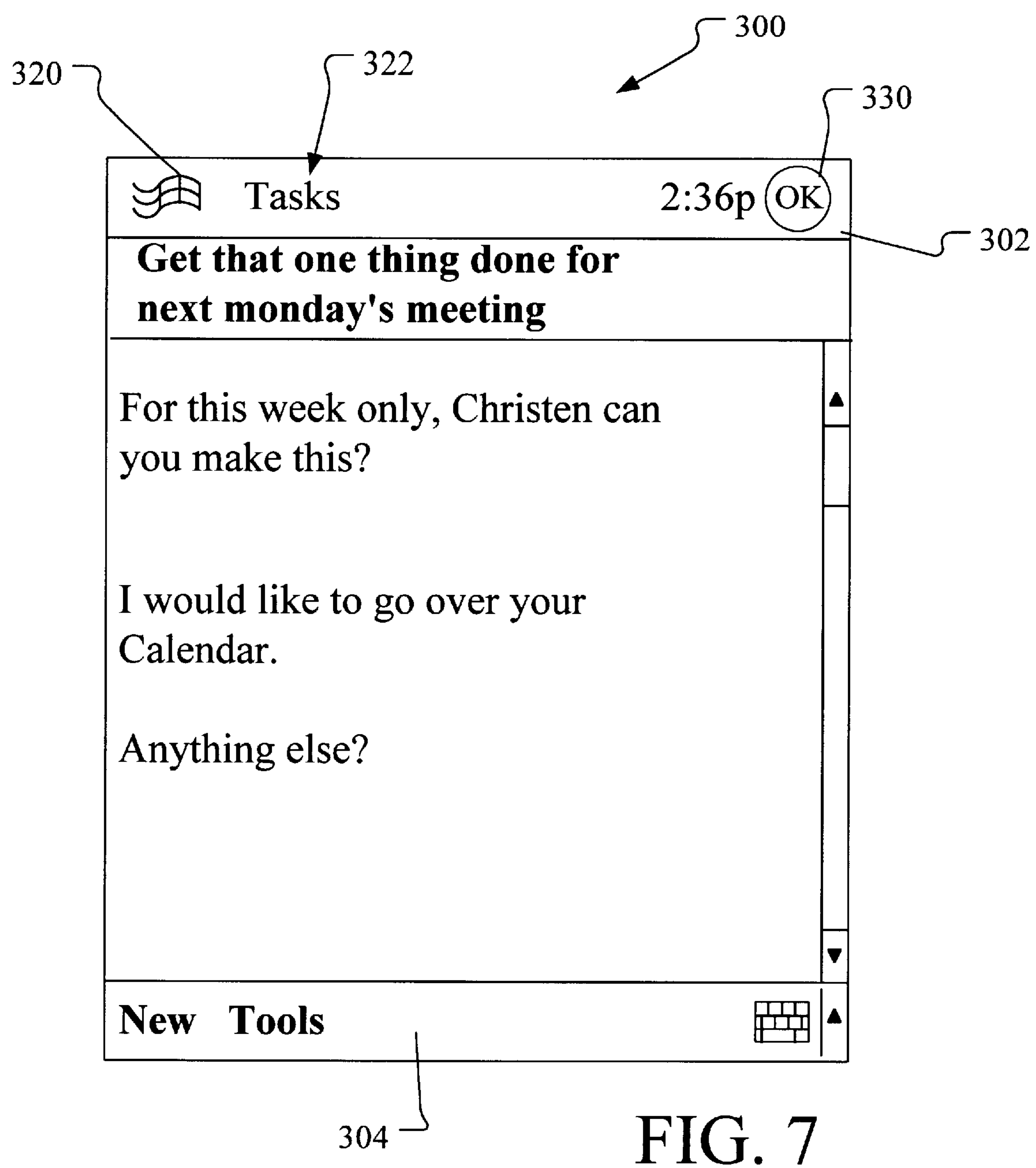

FIGS. 5–7 illustrate features of navigation bar 302 provided by UI 300 of the present invention. When the user wishes to implement a shell program function or to switch between application programs, stylus 86 is used to tap navigation icon 320 to deploy navigation menu 324 as is known in the art. However, upon deployment of navigation menu 324, the shell program changes title 322 from the name of the active application program (see FIG. 4) to "Start" or to a title which clearly indicates to the user that a shell navigation menu is displayed. This is shown for example in FIG. 5. Then, if a different application program is activated, the shell program again changes title 322 displayed in navigation bar 302. For example, in one embodiment, if the "Tasks" item in menu 324 is selected using the stylus as shown in FIG. 6, upon activation of the Tasks program the title 322 in navigation bar 302 is changed accordingly as shown in FIG. 7.

Another feature of UI 300 shown in FIG. 7 is the dynamically controlled inclusion of the confirmation ("OK") button 330 at the top right hand corner in navigation bar 302. Taking advantage of the corners of the screen as places that stand out to the user, in response to a query from the application or shell programs, selecting confirmation button 330 with the stylus dismisses the current screen contents and returns the user to the "owner" (e.g., tapping the confirmation button 330 in an open contact card entry will return the displayed information to the main list). In some embodiments, while confirmation button 330 is displayed in the upper right hand corner of the screen, the clock shifts to the left. Once the confirmation button is no longer displayed, the clock is once again right justified.

Figure 8:
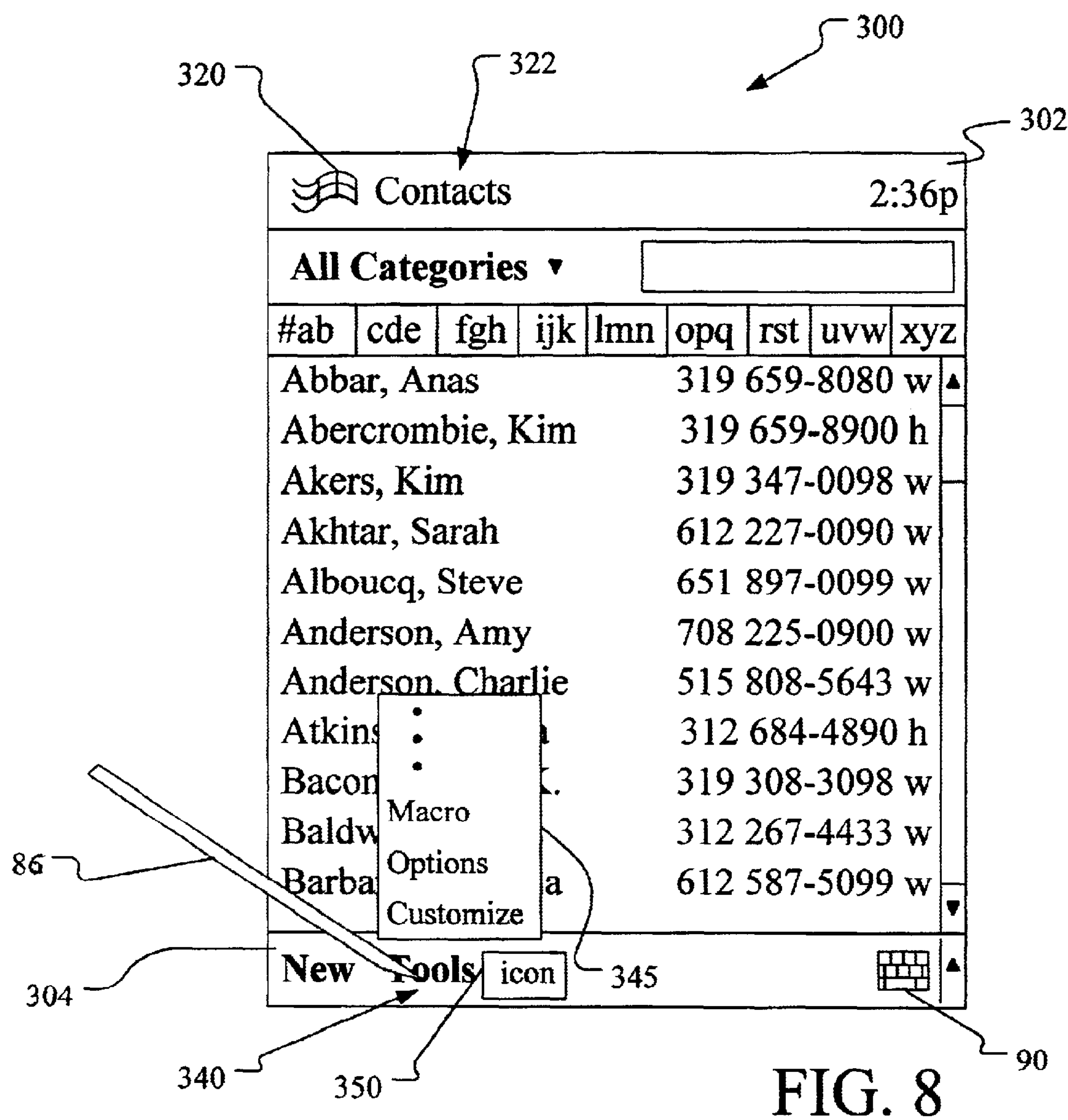
FIG. 8 is a screen-shot of a display showing a portion of the UI of the invention with an application tool menu deployed.

FIG. 8 illustrates yet other aspects of UI 300 in accordance with the present invention. As shown in FIG. 8, menu bar 304 includes menu deploying names or buttons 340 as is known in the art. Tapping one of the menu deploying buttons 340 in menu bar 304 results in deployment of the appropriate menu 345 as is also known in the art. Generally, the user can select desired tools or functions within deployed tool bar menus 345.

In addition to menu bar 304 being positioned at the bottom of the screen, menu bar 304 in UI 300 can include tool bar icons 350. Tapping tool icons 350 results in the implementation or activation of functions (i.e, cut, copy, paste, etc.) as is known in the art. Inclusion of both menu deploying buttons 340 and tool implementing icons 350 on a single menu bar 304 saves vertical real estate on the screen, which is highly beneficial in hand-held devices.

To summarize some of the above discussed aspects of the present invention, the present invention includes a UI, for a stylus based hand-held device, which is optimized for navigation and application control while better utilizing screen space. According to a first aspect of the invention, an application specific title is displayed on the shell program's navigation bar. In the prior art, the application specific title has been displayed by the application in a row separate from the shell program's navigation bar, wasting vertical screen real estate. Further, the navigation bar is placed at the top of the screen since when changing between programs, it is unimportant whether the user's hand blocks the displayed data.

According to a second aspect of the present invention, the UI displays toolbar icons 350 in the same row (i.e., menu bar) as menu buttons 340, thus saving real estate on the display. In some embodiments, this row, which includes the application specific menu buttons and the toolbar icons, is placed at the bottom of the screen so that the user's hand does not block the displayed data when selecting a menu button for deploying a menu or a tool icon for implementing a tool or function which manipulates the data.

According to a third aspect of the present invention, the shell-controlled soft input panel (SIP) button 90 is displayed on the application controlled menu bar 304 at the bottom of the display instead of on the shell program's navigation bar 302 as is conventionally the case.

Although the present invention has been described with reference to particular embodiments, workers skilled in the art will recognize that changes may be made in form and detail without departing from the spirit and scope of the invention.

What is claimed is:

1. A method of generating a user interface for a stylus-based hand-held computing device having a display screen and a stylus for providing user input through the screen, the hand-held device running a shell program and at least one application program, the method comprising:

displaying information for an active application program in a middle portion of the screen; and displaying a shell program controlled navigation bar at a top portion of the screen, wherein displaying the shell program controlled navigation bar includes displaying a navigation icon which when tapped by the stylus aids the user in navigating to other application programs, and wherein displaying the shell program controlled navigation bar further includes displaying on the navigation bar a title for the active program.

2. The method of claim 1, and further comprising:

receiving a first input from the user in the form of a tap on the navigation icon;

displaying a navigation menu in response to the first input; and displaying on the shell program controlled navigation bar a shell program indicative title in place of the title for the active application program while the navigation menu is displayed.

3. The method of claim 2, wherein displaying the shell program indicative title further includes displaying Start on the shell program controlled navigation bar in place of the title for the active application program while the navigation menu is displayed.

4. The method of claim 2, and further comprising:

receiving a second input from the user selecting an alternate application program as the active program; and displaying on the shell program controlled navigation bar a title for the alternate application program selected as the active program.

5. The method of claim 4, wherein displaying the title for the alternate application program selected as the active program further includes displaying the title for the alternate program on the navigation bar when the navigation menu is no longer displayed.

6. The method of claim 1, and further comprising displaying a confirmation icon in a corner of the navigation bar, wherein the user provides a response to a query from the active application program by tapping the confirmation icon.

7. The method of claim 1, and further comprising displaying an application menu bar for the active application program at a bottom portion of the screen.

8. The method of claim 7, wherein displaying the application menu bar for the active application program at the bottom portion of the screen further comprises:

displaying menu deploying buttons on the application menu bar, wherein a tap on the menu deploying buttons with the stylus results in an application program menu being displayed; and displaying a soft input panel icon on the application menu bar, wherein a tap on the soft input panel icon with the stylus controls display of a shell program soft input panel.

9. The method of claim 8, wherein displaying the application menu bar for the active application program further includes displaying tool icons on the application menu bar with the menu deploying buttons and the soft input panel icon.

10. A computer readable medium for a stylus-based hand-held computing device having a display screen and a stylus for providing user input through the screen, the hand-held computing device adapted to run a shell program and at least one application program, the computer readable medium having computer executable instructions for performing steps comprising:

displaying information for an active application program in a middle portion of the screen; and displaying a shell program controlled navigation bar at a top portion of the screen, wherein displaying the shell program controlled navigation bar includes displaying a navigation icon which when tapped by the stylus aids the user in navigating to other application programs, and wherein displaying the shell program controlled navigation bar further includes displaying on the navigation bar a title for the active program.

11. The computer readable medium of claim 10, and further including computer executable instructions for performing steps comprising:

receiving a first input from the user in the form of a tap on the navigation icon;

displaying a navigation menu in response to the first input; and displaying on the shell program controlled navigation bar a shell program indicative title in place of the title for the active application program while the navigation menu is displayed.

12. The computer readable medium of claim 11, and further including computer executable instructions for performing steps comprising:

receiving a second input from the user selecting an alternate application program as the active program; and displaying on the shell program controlled navigation bar a title for the alternate application program selected as the active program.

13. The computer readable medium of claim 12, wherein the computer executable instructions for displaying the title for the alternate application program selected as the active program further includes computer executable instructions for displaying the title for the alternate program on the navigation bar when the navigation menu is no longer displayed.

14. The computer readable medium of claim 10, and further including computer executable instructions for displaying a confirmation icon in a corner of the navigation bar, wherein the user provides a response to a query from the active application program by tapping with the stylus on the confirmation icon.

15. The computer readable medium of claim 10, and further including computer executable instructions for displaying an application menu bar for the active application program at a bottom portion of the screen.

16. The computer readable medium of claim 15, wherein the computer executable instructions for displaying the application menu bar for the active application program at the bottom portion of the screen further includes computer executable instructions for performing steps comprising:

displaying menu deploying buttons on the application menu bar, wherein a tap on the menu deploying buttons with the stylus results in an application program menu being displayed; and displaying a soft input panel icon on the application menu bar, wherein a tap on the soft input panel icon with the stylus controls display of a shell program soft input panel.

17. The computer readable medium of claim 16, wherein the computer executable instructions for displaying the application menu bar for the active application program further includes computer executable instructions for displaying tool icons on the application menu bar with the menu deploying buttons and the soft input panel icon.

18. A method of generating a user interface for a stylus-based hand-held computing device having a display screen and a stylus for providing user input through the screen, the hand-held device running a shell program and at least one application program, the method comprising:

displaying information for an active application program in a middle portion of the screen; and displaying an application menu bar for the active application program at a bottom portion of the screen such that the user can manipulate information for the active application program displayed in the middle portion of the screen by tapping with the stylus on the application menu bar without blocking the user's view of the middle portion of the screen, wherein displaying the application menu bar for the active application program further comprises displaying a soft input panel icon on the application menu bar, wherein a tap on the soft input panel icon with the stylus controls display of a shell program soft input panel.

19. The method of claim 18, wherein displaying the application menu bar further comprises: displaying menu deploying buttons on the application menu bar, wherein a tap on the menu deploying buttons with the stylus results in an application program menu being displayed.

20. The method of claim 19, wherein displaying the application menu bar for the active application program further includes displaying tool icons on the application menu bar with the menu deploying buttons and the soft input panel icon.

* * * * *